Patented Dec. 31, 1935

2,025,705

UNITED STATES PATENT OFFICE 2,025,705

MANUFACTURE OF MILL PRODUCTS FOR ALIMENTARY PURPOSES AND OF PASTE GOODS AND BAKED PRODUCTS FROM SUCH MILLED PRODUCTS

Moritz Bienenstock and Ladislaus Csáki, Budapest, Hungary, Julius Pless, Bratislava, Czechoslovakia, and Adalbert Sági and Eugen Sági, Budapest, Hungary No Drawing. Application August 15, 1932, Serial No. 628,958. In Hungary August 31, 1931

15 Claims. (Cl. 99—10)

This invention relates to the manufacture of mill products for alimentary purposes. The invention further relates to the manufacture of paste goods (macaroni and the like) and baked products from such milled products.

The invention permits the manufacture of foodstuffs which are rich in gluten proteins, independently of wheat. The invention consists in that the germinal substance of seed kernels of the carob tree (Ceratonia siliqua) or of related plant genera of the families of the Caesalpinaceæ, or Mimosaceæ, for example the Cercis species (Cercis siliquastrum, Cercis canadensis, Cercis chinensis) is, without substantially denaturing the gluten-forming proteins, converted into mill products (coarsely comminuted, rough-ground, ground to meal or converted into flakes by steaming the grits and rolling). The term "denaturing" is used to include any change in the nature of the gluten-forming proteins which would substantially alter the gluten-developing character of the said proteins. Such alteration is not perceptible externally and does not necessarily lead to any detectable change in the chemical composition, but can be readily ascertained by practically testing the mill products as to their property of forming dough. It is an essential feature of the present invention that during separating, drying and milling of the germinal matter, denaturing of the proteins, either through mechanical or thermal or chemical or other influences, has to be avoided substantially.

The seed kernels of the plant genera specified contain hemi-celluloses (also called gum substances or reserve celluloses) as a compact store in the form of the endosperm consisting of two lamellæ. These lamellæ enclose the embryo with its organs, the germinal substance rich in proteins. The gum substances of such seed kernels have already been utilized technically. Thus, for example, husked and de-germinated carob bean kernels are on the market in the form of flour, which is used for the manufacture of adhesives, sizes and dressings and binding agents.

The invention is based on the surprising discovery that the germinal substance of such seed kernels contains proteins which, in their physical behaviour and chemical composition resemble, the gluten proteins of the wheat grain (which do not occur in wheat, however, as the constituents of the germinal substance) to such an extent that it is possible to spreak of a perfect agreement. More particularly, the germinal substance of the seed kernels of the fruit of the carob tree is rich in such proteins which, in regard to salts, acids and alkalies and also various anions and cations, behave physico-chemically absolutely like wheat gluten proteins. In addition, the germinal substance contains various amounts of polysaccharides and cellulosic substances but no starch.

Wheat flour differs from the flour of all other cereals in the property of leaving behind in an almost pure state the bulk of its protein compounds on continued kneading of the dough under water or under a jet of water, in the form of a coherent resilient mass, the so-called gluten. The wheat grain however contains the gluten dispersed in the flour cells constituting the endosperm. In contradistinction thereto, the organs which, in the seed kernels of the plant families specified, are the carriers of the gluten proteins, can be separated mechanically as a whole from the other organs. It is therefore possible to obtain products rich in proteins simply by converting the separated germinal substance as a whole into grits, groats, flour or flakes by the methods usually employed in treating cereals. Apart from this however, this process means a valuable contribution to the technical production of foods, because among the bread cereals, only the gluten proteins of rye share with the similar glutens of wheat the high swelling power to which are due the peculiar dough-forming properties and baking capacity of these two bread cereals, and since gluten-developing seeds other than wheat have heretofore not been known at all.

In order to separate the germinal substance, the latter, after the seed kernels have been husked, is detached from the endosperms by known mechanical methods, in doing which care should be taken that during husking and de-germination of the seed kernel, there does not occur, either through mechanical or thermal influences, a substantial denaturation of the gluten-forming proteins. In carrying out the separation by the wet method and drying the germinal substance before comminuting the same, this drying operation has to be effected at so low a temperature (preferably not above 40–50°

C.) that such injury is likewise avoided. It is advisable to promote drying by means of a vacuum or a heated current of air.

In their original character, the milled products have an egg-yellow colour. On suspending them in water, however, the color changes to green, the water also assuming this color. This undesired coloration, which is evidently due to the chlorophyll or its derivatives contained in the milled products, may be eliminated by the action of dilute acids. For this purpose the milled products may be intimately mixed for example with small quantities of solid acids (such as citric acid) or with solids having an acid action. Acids may also be incorporated with the milled products as very dilute solutions in the form of mists. In this way, it is also possible to prevent the dough assuming a greenish color when worked up with weakly baking powders. Exactly the same results are obtained when the acid or acid-acting substances are only added to the water used for preparing the dough.

The milled products may also be decolorized by a bleach of the usual type, more particularly with oxidizing bleaching agents (hypochlorites, for example sodium paratoluene-sulphone-chloramide, peroxides, persalts or the like), instead of by the action of acids.

A palatable baked product cannot be made from wheat gluten alone. In wheat flour, the gluten proteins are diluted by a very considerable excess of starch. In the germinal substance flour of the plant seeds specified, for example carob bean kernels, the gluten proteins are only diluted with comparatively small quantities of other substances. Therefore for this reason alone this flour provides a dough which, although it is compact and resilient, cannot be baked successfully. In addition, the germinal substance flour, due to its higher gluten content, possesses a much greater capacity for absorbing water than wheat flour. Whereas the quantity of water required for preparing a normal bread dough from wheat flour amounts to 50–70 per cent. of the weight of the flour, the germinal substance flour for example of the carob bean kernel absorbs 140–200 per cent. of its own weight of water in forming a dough of similar consistency. By thinning the germinal substance flour with food flours (flours which are low in gluten or free from gluten being preferably selected), or with other slightly swelling additions, such as cellulose (for example in the form of bran) or starch, casein or the like, the baking capacity may be enhanced to the required extent. Such additions have previously been made to wheat flour for the same purpose. Thus, it is known to work up milled wheat gluten or pure wheat gluten albumen with bran, which has been freed from carbohydrates in any manner, into baked products for diabetics. It has further been proposed to bake wheat gluten albumen in admixture with the flour of germs of the cereals. Likewise, it has also been proposed to render pure wheat gluten capable of being baked by admixture with casein.

Another method is the addition of suitable salts. It is already known that the water-binding property of wheat gluten may be modified by the action of acids, bases and salts. Different additions have been investigated for the effect with the same molecular concentration and were arranged in a series, it being found that the influence of anions preponderates in restricting the absorption of water. This also applies for the new germinal substance flours. Among the different additions coming into consideration in practice, tartrates have a pronounced effect. It is therefore advisable to add tartrates, for example potassium bitartrate, to the mill products under consideration in order to reduce the water-binding power. For the same purpose, however, borates, phosphates and citrates or the like could be used for example.

The same object may finally be attained by impairing the swelling power of the milled products themselves, or by depriving them entirely of swelling power, for example by heating, and using them for thinning unaltered mill products. If for this purpose the mill products are heated at temperatures between 150° and 260° C. until slight roasting occurs, a very perceptible improvement in the taste occurs at the same time.

All this applies chiefly for baked products and only applies in the second place for paste goods (macaroni and the like). On the contrary, in the case of articles in paste form produced from germinal substance flour according to the invention, the disadvantage is found that a spongy mass is formed on cooking the dough. This may be counteracted by an addition of hemi-celluloses of any origin to the flour or paste. Preferably, milled products of whole plant seeds, in the endosperms of which hemi-celluloses are started up, or the endosperms of such seed grains, will be used either alone or in combination.

The mill products may be worked up in the usual manner into dough and baked. The paste goods may be dried in the usual manner for the purpose of preserving them. Further, the finished baked products may be ground to grits or flour with the object of making flours for special purposes.

The seeds mentioned are particularly suited for making diabetic foods, but there is the difficulty that the germinal substance contains varying quantities of assimilable sugars. Such sugars are found for instance in the germinal substance of the carob tree kernels in quantities of about 7% of the germinal substance.

It has been now found that the germinal substance can be easily freed from the said admixtures which, even in small quantities, are undesirable constitutents of diabetic foods, and this can be done in a very simple manner and without in any way affecting the very great nutritive value and flavor of the said substance.

For the purpose in question, the germinal substance is preferably lixiviated with water or aqueous solutions, for instance of salts or of acids, or additions possessing basic properties, the object being best attained by submitting the germinal substance to this treatment in coarse pieces. In this way by frequently changing the lixiviating liquid, the assimilable sugars can be eliminated to such an extent that at the outside only traces are left in the material. The material is also improved thereby in so far as a considerable portion of other accompanying substances which unfavorably affect the color, smell or flavor of the product, are extracted at the same time by the water or aqueous liquids. After the lixiviation is finished, the residue is carefully dried and thereupon given the desired form, for instance coarsely comminuted, rough-ground, milled or converted into flakes (by steaming the grits and rolling). The ground products thus obtained can be converted in the usual manner into foodstuffs (articles in paste form such as macaroni and the like, and baked products).

In place of water, for the lixiviation may also be used mixtures of water and solvents soluble in water (such as for instance alcohol), or the process of extraction may be carried out exclusively with other solvents which dissolve sugars.

According to another method of carrying the invention into practical effect, the germinal substance is deprived of sugar by fermentation. To that end, it is either left in the presence of water to spontaneous fermentation, or an alcoholic fermentation is started in the usual manner by the addition of yeast, or an acid fermentation by infection with bacteria, for instance lactic acid bacteria. Such fermenting processes also have at the same time a favorable effect on the flavor, smell and color of the material.

Such processes of extraction and fermentation are carried out with advantage also successively (in any desired sequence).

De-naturing has, of course, to be avoided also in these operations. It is advisable therefore to carry out the grinding and the lixiviation of the germinal substance at suitably low temperatures and, when working with aqueous solutions, to use the additions in a concentration which is harmless to the gluten-forming proteins. If the germinal substance is being deprived of sugar by fermentation, the process must be stopped in good time from that point of view, or an undesired increase of acidity may be prevented by repeatedly exchanging the water or by an addition of basic agents. The drying of the germinal substance, following the treatment with liquids, must also be carried out at such a low temperature as to avoid any de-naturing by theremal influence.

It is obvious that losses of gluten proteins must also be avoided. Thus for instance a solution of sodium-chloride should not be used for extracting sugar in such a concentration that a part of the gluten proteins would be carried away at the lixiviation.

The so treated germinal substance may be submitted to a further purification by treatment with fat-dissolving agents, more particularly with benzol. With the greatest part of the fat are removed the substances producing smell and taste as well as the coloring matters. The treatment with fat-solvents may also be carried out before the process of extraction of sugar.

If for any reason the dough-forming properties or the bread-making value of the product should have suffered, this can be compensated by adding to the germinal substance a suitable quantity of undamaged gluten. For this purpose may be used either wheat gluten, or gluten obtained from the germinal substance of the seeds mentioned by washing out.

*Examples*

1. The seed kernels of *Ceratonia siliqua* are husked either in the dried or soaked condition. The separation of the germinal substance is most simply effected by splitting the husked seeds and sieving out the crumbly embryo parts. To 100 kilograms of a flour obtained by milling this germinal substance is added 0.2 to 0.5 kilograms of solid citric acid in the form of powder, and the whole is thoroughly mixed. As much water is now added to the flour as will form a compact and plastic dough, which may be baked in thin layers in the way of making unleavened bread. The effect of the addition of citric acid is that the dough retains its yellowish color, and the change to a green color occurring on contact with water without the addition of acid does not take place.

2. Seventy kilograms of a gluten-free flour, for example rice flour, potato flour or legume flour is mixed with 30 kilograms of the milled germinal substance of *Ceratonia siliqua*. The mixed flour, due to its content of gluten proteins introduced with the germinal substance flour, may be made into a dough in the usual manner and baked with yeast.

Baked products can also be prepared from the same flour by means of baking powder without the addition of leaven or yeast. As compared with the usual method of making baked products by means of baking powders, the only difference is that the acid should be in excess in the baking powder. For example, for every kilogram of germinal substance flour, 90 kilograms of a baking powder are used consisting of 30 grams of sodium bicarbonate and 60 grams of tartaric acid. The flour mixed with the baking powder is made into a dough with 0.8 litre of water per kilogram of flour and is baked.

3. For making a pastry, 80 kilograms of germinal substance flour from *Ceratonia siliqua* are mixed with 20 kilograms of starch-free bran, mixed with water and the usual ingredients, kneaded to a dough and baked.

4. 100 kilograms of a flour of the germinal substance from *Ceratonia siliqua* is thoroughly mixed with 0.3 to 0.8 kilograms of potassium bitartrate. Due to the reduction in swelling power, the flour absorbs considerably less water during the formation of dough than without this addition. The dough may be used for making paste goods (macaroni and the like) or baked products, and more particularly bread. For the latter purpose, 100 kilograms of this flour, for example, is worked up in the usual manner with 80 litres of water, with the addition of 2 kilograms of salt, 3 kilograms of yeast and 5 kilograms of dextrose, into a homogeneous dough, is left to ferment and baked in the oven. The bread obtained in this way possesses a crust of normal quality. The crumb is yellowish, if the flour has not been previously bleached, and has the porosity of rye bread as well as a pleasant bread-like odour and taste.

5. Seventy kilograms of flour of the germinal substance of *Ceratonia siliqua* is mixed with 30 kilograms of a portion of the same flour which has previously been converted by heating (scorching) into a form which is capable of swelling only slightly or not at all. The mixed meal with addition of the necessary ingredients is made into a dough which is baked in the usual manner.

6. Seventy kilograms of flour of the germinal substance of *Ceratonia siliqua* is mixed with 5 kilograms of a flour obtained by milling the endosperms of *Ceratonia siliqua* and with the addition of suitable quantities of salts, egg yolk (if desired also 10 kilograms of the scorched flour of the germinal substance) are worked up with water to a hard dough which is cut, stamped or pressed into suitable shapes, and is then subjected to a drying process such as is generally employed for the preparation of paste goods.

7. The germinal substance of *Ceratonia siliqua* reduced to coarse grains and freed by sieving from the finest particles, is mixed with five times its quantity of water and left to stand at room temperature, with frequent stirring. After about 1 to 1½ hours, the water is drawn off, and fresh water poured upon. The water is changed as often as required until the desired degree of extraction of sugar is reached. After the lixiviation, the excess of water is removed, and the material dried at the lowest possible temperature, for instance 40° C. in a current of warm air or in a vacuum, and thereupon ground to the desired degree of fineness. The ground product obtained has a clear light-yellow color and after a sufficiently long treatment with water, is practically free from assimilable carbohydrates, and has no smell or taste.

In place of water may be used a 30 to 60% aqueous solution of alcohol, to accelerate the extraction of sugar. The same object may also be attained by the use of a very diluted solution of common salt or hydrochloric acid.

8. The comminuted germinal substance of *Ceratonia siliqua* is poured over with water at a temperature which is slightly above ordinary temperature, and left to spontaneous fermentation. The degree of sugar extraction is ascertained by taking samples. The further treatment is similar to that in Example 7.

9. The germinal substance deprived of sugar by the treatment with water according to Example 7, is extracted with benzol in one of the usual apparatus, dried, ground and used for the preparation of foodstuffs (articles in paste form such as macaroni and the like, and bakers' wares).

10. To a ground product of germinal substance, the dough-forming properties or the baking capacity of which have suffered during the treatment according to Examples 7 to 9 or during the previous treatment, are added 4–10% of wheat gluten or of a gluten prepared from the germinal substance of *Ceratonia siliqua*. The product is then worked up to paste goods or baked products in the usual manner.

We use the terms "thinning material" and "thinning addition" in the following claims to include slightly swelling additions such as food flours, preferably low in gluten or gluten-free, or cellulose, starch, casein, or germinal matter not containing gluten, or an addition of salts capable of reducing the swelling power of wheat gluten proteins.

In the following claims we use the term "undenatured" to exclude that condition of the gluten-forming proteins contained in the germinal substance of seed kernels of the class specified in which the said proteins or the milled germinal substance containing these proteins have lost their dough forming character. The term "denatured" is used in the adverse sense. The characteristic quality defined by the said terms can be ascertained by practically testing the milled products of the germinal substance as to their property of forming dough.

We claim:—

1. A product for alimentary purposes comprising a mixture of milled germinal substance of the seeds of *Ceratonia siliqua*, and an addition agent capable of reducing the water-binding power of the said germinal substance.

2. A product for alimentary purposes comprising a mixture of milled germinal substance of the seeds of the Cercis species, and an addition agent capable of reducing the water-binding power of the said germinal substance.

3. A product for alimentary purposes comprising a mixture of milled germinal substance of the seeds of representatives of the class consisting of the families of Caesalpiniaceæ and Mimosaceæ, and an addition agent capable of reducing the water-binding power of the said germinal substance.

4. A product for alimentary purposes comprising a mixture of milled germinal substance of the seeds of *Ceratonia siliqua* and a salt having the capacity of reducing the swelling power of wheat gluten.

5. A product for alimentary purposes comprising a mixture of undenatured milled germinal substance of the seeds of *Ceratonia siliqua* and a portion of the germinal substance itself being in a denatured state.

6. An undenatured mill product of germinal matter of the seeds of *Ceratonia siliqua* having a solid acid distributed therein.

7. A product for alimentary purposes comprising milled germinal matter of the seeds of *Ceratonia siliqua*, and being substantially free from assimilable sugars.

8. A process of making a foodstuff which comprises husking seed kernels of *Ceratonia siliqua*, separating the germinal matter from the endosperm, grinding the said matter to meal, mixing the meal with an edible hemi-cellulose contained in the endosperm of representatives of the class consisting of the families of Caesalpiniaceæ and Mimosaceæ, impasting the mixture working up the dough to paste good, and drying.

9. A process of making a foodstuff which comprises husking seed kernels of *Ceratonia siliqua*, separating the germinal matter from the endosperm, grinding the said matter to meal, mixing the meal with a thinning addition, impasting the mixture with acidulated water, working up the dough to paste good, and drying.

10. A process of making a foodstuff which comprises husking seed kernels of *Ceratonia siliqua*, separating the germinal matter from the endosperm, grinding the said matter to meal, mixing the meal with a thinning addition, impasting the mixture with acidulated water, and baking.

11. A process for making foodstuffs comprising impasting a mixture of undenatured milled products of the germinal substance of the seeds of *Ceratonia siliqua*, and wheat gluten, and baking.

12. A process for making foodstuffs comprising husking seed kernels of *Ceratonia siliqua*, separating the germinal matter from the endosperm, bleaching the said separated germinal matter by the action of agents possessing acid properties, all the said steps being effected while saving the germinal matter from a substantial decrease of its gluten-developing properties, whereafter the so treated germinal matter is mixed with thinning material, and the mixture is made into dough and the dough worked up to paste goods and dried.

13. A process for making foodstuffs comprising husking seed kernels of *Ceratonia Siliqua*, separating the germinal matter from the endosperm, bleaching the said separated germinal matter by the action of agents possessing acid properties, all the said steps being effected while saving the germinal matter from a substantial decrease of its gluten-developing properties, whereafter the so treated germinal matter is mixed with thinning material, and the mixture is impasted, and baked.

14. A process for making foodstuffs, which comprises impasting a mixture of undenatured milled products of the germinal substance of the seed kernels of plants of the class consisting of *Ceratonia siliqua*, *Cercis siliquastrum*, *Cercis*

*canadensis* and *Cercis chinensis*, and thinning material, working up the dough to paste goods, and drying.

15. A process for making foodstuffs, which comprises impasting a mixture of undenatured milled products of the germinal substance of the seds of plants of the class consisting of *Ceratonia siliqua, Cercis siliquastrum, Cercis canadensis and Cercis chinensis* and thinning material, and baking.

JULIUS PLESS.
MORITZ BIENENSTOCK.
LADISLAUS CSÁKI.
EUGEN SÁGI.
ADALBERT SÁGI.